Dec. 7, 1937.　　　　M. T. HEMPE　　　　2,101,778
AIRCRAFT
Filed March 30, 1936　　　3 Sheets-Sheet 1
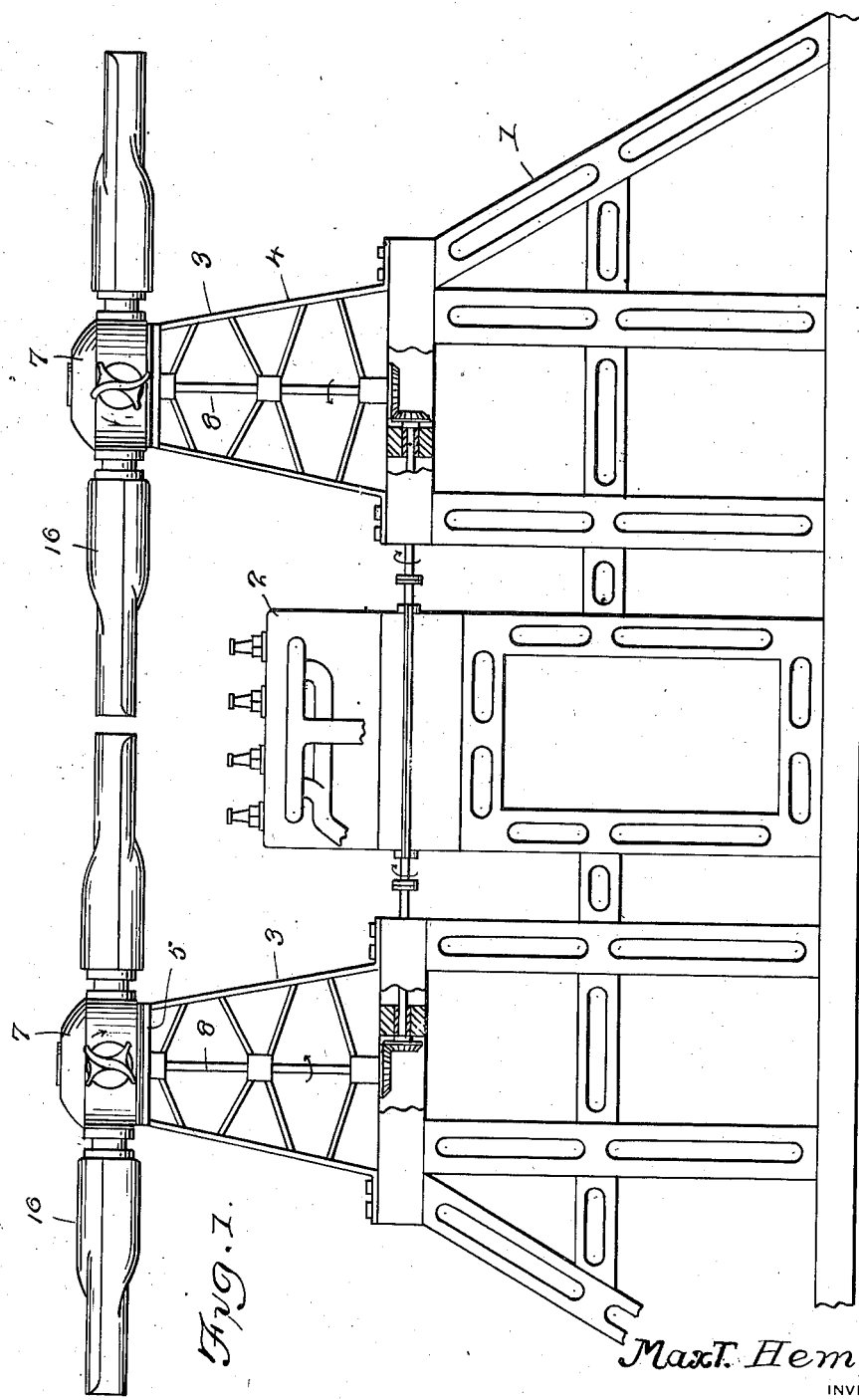
Max T. Hempe
INVENTOR
BY Victor J. Evans & Co.
ATTORNEY Dec. 7, 1937.    M. T. HEMPE    2,101,778
AIRCRAFT
Filed March 30, 1936    3 Sheets-Sheet 2
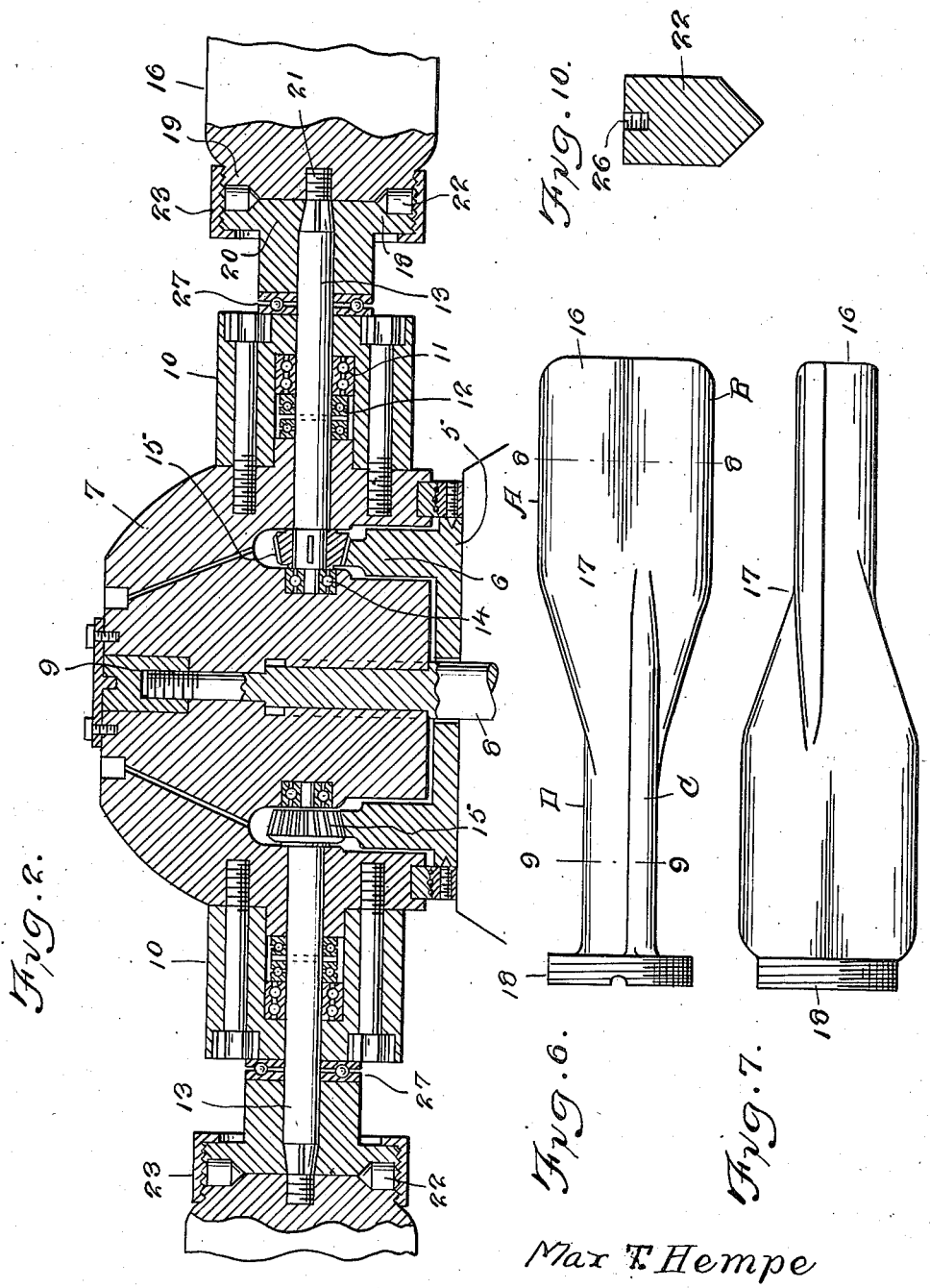
Max T Hempe
INVENTOR
BY Victor J. Evans & Co.
ATTORNEY Dec. 7, 1937.                M. T. HEMPE                    2,101,778
                              AIRCRAFT
                         Filed March 30, 1936        3 Sheets-Sheet 3
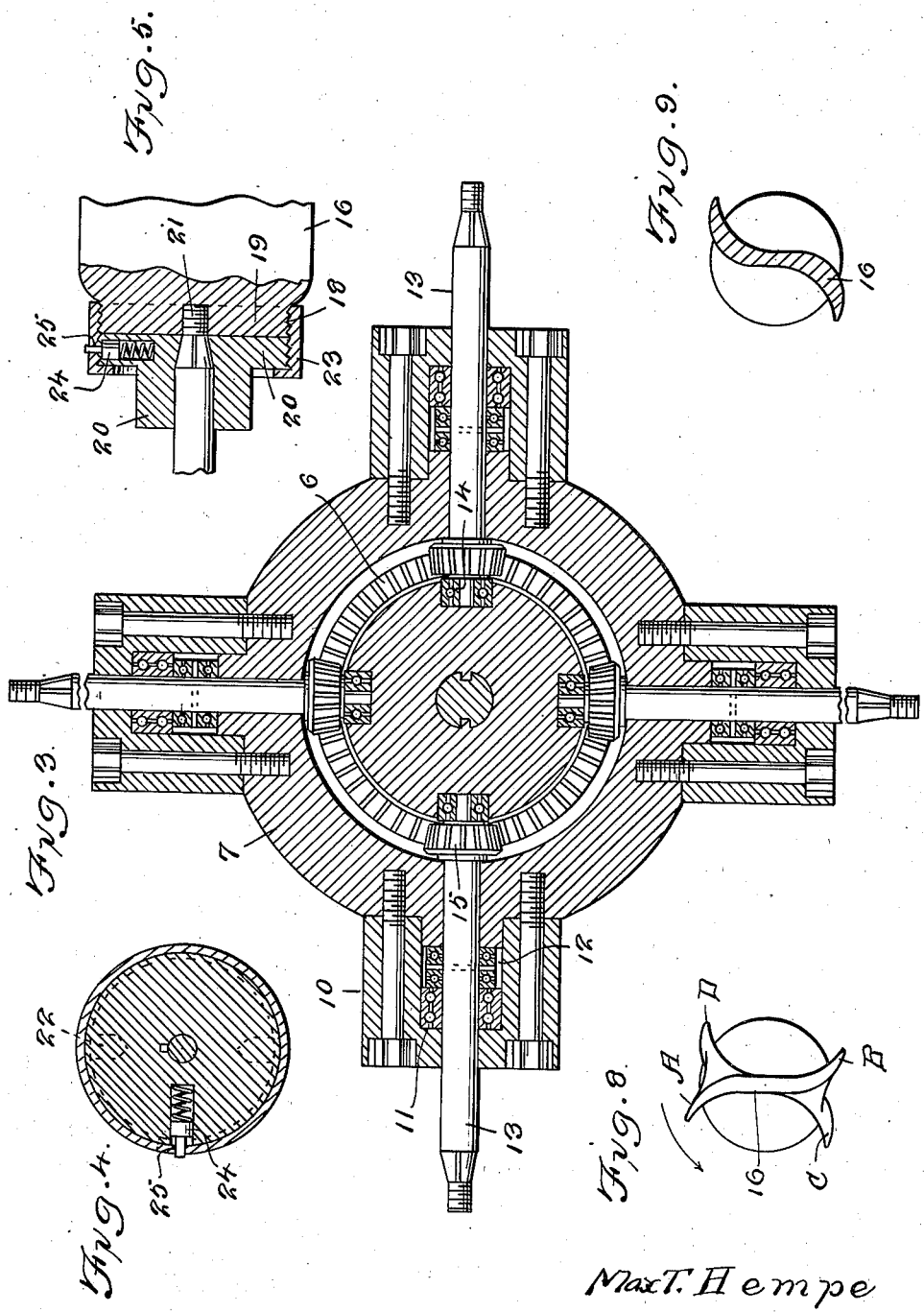
Max T. Hempe
INVENTOR
BY Victor J. Evans & Co.
ATTORNEY Patented Dec. 7, 1937

2,101,778

UNITED STATES PATENT OFFICE 2,101,778

AIRCRAFT

Max Theodore Hempe, Providence, R. I.

Application March 30, 1936, Serial No. 71,735

3 Claims. (Cl. 170—162)

This invention relates to aircraft and more particularly to helicopters therefor whereby an aircraft may be made to rise and descend vertically for rendering take offs and landing more easily accomplished and within a limited space and has for the primary object the provision of improved propellers rotatable about vertical axes and in opposite directions and each consisting of specially constructed blades and each blade rotating about its own axis and of novel pitch so that the propellers will have maximum lift or pulling power.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating helicopter construction especially adaptable for aircraft and constructed in accordance with my invention.

Figure 2 is a fragmentary vertical sectional view illustrating one of the propellers and the driving means therefor.

Figure 3 is a horizontal sectional view showing the driving means forming a part of the propeller.

Figure 4 is a transverse sectional view showing a locking means for securing a blade of the propeller to its hub construction.

Figure 5 is a fragmentary vertical sectional view showing the securing of the blade to the hub construction and the latter to a blade shaft.

Figure 6 is a plan view illustrating one of the blades.

Figure 7 is a view similar to Figure 6 showing an edge of the blade.

Figure 8 is a sectional view taken on the line 8—8 of Figure 6.

Figure 9 is a sectional view taken on the line 9—9 of Figure 6.

Figure 10 is a vertical sectional view illustrating a pin employed for securing the blade to its hub construction.

Referring in detail to the drawings, the numeral 1 indicates a fragmentary portion of a frame construction employed in an aircraft and which provides a mounting for an engine 2 and helicopters 3 forming the subject matter of the present invention.

Sub-frames 4 are mounted on the frame construction 1 and extend vertically to provide supports for the helicopters and the drive means therefor. The helicopters rotate in opposite directions to each other due to their connections with the engine 2. It is to be understood that the helicopters are arranged above the body of the aircraft and are employed to cause the aircraft to ascend and descend in a substantially vertical path. Further, it is to be understood that the helicopters are only employed during the take-off and landing of the aircraft, the latter being sustained in flight in the usual manner.

Each helicopter consists of a plate 5 suitably mounted to the sub-frame 4 and has formed integrally therewith a ring gear 6. A housing 7 is journaled on the plate and is detachably secured to a shaft 8 driven by the engine 2. The housing 7 is keyed to the shaft 8 as well as being threaded thereto, as shown at 9. Detachably secured to the housing 7 are boxes 10 carrying anti-friction bearings 11 and thrust bearings 12. Extending through the boxes and bearings thereof are stub shafts 13 which are also supported by bearings 14 mounted in the housing 7. Pinions 15 are secured to the stub shafts and mesh with the ring gear 6. The stub shafts are grouped radially about the shaft 8 and have detachably secured thereto blades 16. With the construction so far described, it will be seen that the blades are caused to revolve in a horizontal plane and also each blade rotates about its own axis due to the stub shafts being geared to the fixed ring gear 6 and the housing 7 rotating with the shaft 8.

Each blade 16 consists of a body portion 17 and an attaching portion 18 at one end thereof to be detachably secured to the stub shaft. The attaching portion of the blade consists of plate-like parts 19 and 20 separable from each other and the plate-like parts form an integral part of the body portion 17 of the blade. The plate-like part 19 has a threaded socket 21 to receive the threaded end of the stub shaft while the plate-like part 20 has a bore and a keyway to receive the stub shaft and the key. The opposing faces of the plate-like parts 19 and 20 are notched to receive pins 22 establishing driving connection between said plate-like parts. A collar 23 is threaded onto the plate-like parts 19 and 20 for retaining the pins 22 in the notches and the collar is held against accidental unthreading by a spring-pressed pin 24 fitting in an opening 25 of the collar and carried by the plate-like part 20. To remove the collar from the plate-like parts 19 and 20, the pin 24 must be disengaged from the opening 25 and with the collar removed the pins 22 may be readily withdrawn from the notches so that the body of the blade may be unthreaded from the stub shaft, the pins 22 being provided with screw threaded sockets 26 in which a threaded tool may be threaded when desiring to remove the pins from the notches.

The body 17 of the blade 16 is shaped to provide fin parts A, B, C, and D. The fin parts A and B are arranged in one pair and the fin parts C and D are arranged in a second pair. The fin parts A and B are reversely curved, also the fin parts C and D are reversely curved, thus presenting concavo convex surfaces clearly shown in Figure 8. The pairs of fin parts cooperate in forming on opposite faces of the body of the blade valleys extending substantially the full length of the body. Thus it will be seen that the fin parts A, B, C, and D present to the body of the blade pitches reversely arranged to each other. A blade of the construction described when revolving in a horizontal plane will have a substantially continuous pitch and also a blade of this kind when rotating about its own axis simultaneously when rotating about a vertical axis and in a horizontal plane will provide maximum lifting or pulling power. During the rotation of the blade about its own axis the air caught by the fin part A is caused to travel inwardly or towards the attached end of the blade along the valley in the advancing face of the blade until opposite the fin part D where the stream of air is caused to reverse its direction of flow and then travels towards the forward or free end of the blade to be caught by the fin part B which in turn reverses the flow of the air stream in the same direction as accomplished by the fin A.

The bearings 27 are arranged on the stub shafts between the plate-like parts 20 of the blades and the boxes 10.

Having described the invention, I claim:

1. A helicopter propeller comprising a housing, a plate supporting the housing for revolution in a horizontal plane, boxes detachably secured to said housing, shafts journaled in said boxes and extending into the housing, a ring gear secured to the plate, pinions connecting the ring gear to the shafts, blades detachably secured to said shafts, and bearings interposed between the blades and the boxes and supported by the shafts.

2. A blade for a helicopter propeller comprising a rotatable body terminating at one end in a plate-like part, a second plate-like part abutting the first plate-like part, said plate-like parts having notches in the opposing faces thereof, pins received in the notches, and a collar having threaded engagement with said plate-like parts for retaining the pins in the notches and maintaining said parts in assembled relationship.

3. A blade for a helicopter propeller comprising a rotatable body terminating at one end in a plate-like part, a second plate-like part abutting the first plate-like part, said plate-like parts having notches in the opposing faces thereof, pins received in the notches, a collar threaded to the plate-like parts and maintaining said parts in assembled relationship, said collar overlying the pins and having an opening therein, a spring-pressed pin carried by the second plate-like part and received in the opening of the collar.

MAX THEODORE HEMPE.